(12) United States Patent
Guedalia

(10) Patent No.: US 6,480,711 B1
(45) Date of Patent: Nov. 12, 2002

(54) METHOD AND SYSTEM FOR WIRELESS DATA COMMUNICATION OVER THE INTERNET

(75) Inventor: Jacob Leon Guedalia, Palo Alto, CA (US)

(73) Assignee: NMS Communications Corporation, Framingham, MA (US)

(*) Notice: Subject to any disclaimer, the term of this patent is extended or adjusted under 35 U.S.C. 154(b) by 0 days.

(21) Appl. No.: 09/153,079

(22) Filed: Sep. 15, 1998

(51) Int. Cl.[7] ............... H04M 11/10; H04M 3/42; H04M 1/64
(52) U.S. Cl. ............ 455/412; 455/415; 379/88.17; 379/88.18
(58) Field of Search ................. 455/412, 415, 455/517, 550, 556, 557; 370/428, 426, 260, 261, 263; 379/88.17, 88.04, 88.18; 707/501; 709/219

(56) References Cited

U.S. PATENT DOCUMENTS

| | | | | |
|---|---|---|---|---|
| 5,799,063 A | * | 8/1998 | Krane | 379/67 |
| 5,802,526 A | * | 9/1998 | Fawcett et al. | 707/104 |
| 5,838,768 A | * | 11/1998 | Sumar et al. | 379/88.14 |
| 5,884,262 A | * | 3/1999 | Wise et al. | 379/88.17 |
| 5,915,001 A | * | 6/1999 | Uppaluru | 379/88.22 |
| 6,005,845 A | * | 12/1999 | Svennesson et al. | 370/260 |
| 6,021,428 A | * | 2/2000 | Miloslavsky | 709/206 |
| 6,055,302 A | * | 4/2000 | Schmersel et al. | 379/207 |
| 6,058,303 A | * | 5/2000 | Åstrom et al. | 455/413 |
| 6,219,694 B1 | | 4/2001 | Lazaridis et al. | |
| 6,243,443 B1 | * | 6/2001 | Low et al. | 379/88.17 |

OTHER PUBLICATIONS

Victor W. Zue "Navigating the Information Superhighway Using Spoken Language Interfaces", IEEE Expert, Oct. 1995, pp. 39–43.

Matthew Lennig, "Putting Speech Recognition to Work in the Telephone Network", IEEE Institute of Electrical and Electronic Engineers, Aug. 1990, pp. 35–41.

Frank Stajano, et al., "The Thinnest of Clients: Controlling it all via Cellphone", Mobile Computing and Communications Review, vol. 2, No. 4, Oct. 1998.

* cited by examiner

Primary Examiner—Edward F. Urban
Assistant Examiner—Sheila Smith
(74) Attorney, Agent, or Firm—Hoffman, Wasson & Gitler, PC

(57) ABSTRACT

A method and system for wireless data communication, including the steps of receiving an input request, filtering data from at least one database to produce filtered data in response to the input request, attaching formatting instructions to the filtered data corresponding to a data format specific to a wireless data terminal to produce a pre-formatted response, sending the pre-formatted response to a wireless transmitter, formatting the pre-formatted response according to the formatting instructions to produce a formatted response, and transmitting the formatted response from the wireless transmitter to the wireless data terminal.

16 Claims, 2 Drawing Sheets

METHOD AND SYSTEM FOR WIRELESS DATA COMMUNICATION OVER THE INTERNET

FIELD OF THE INVENTION

The present invention relates to wireless data communication.

BACKGROUND OF THE INVENTION

Thin data mobile wireless communication units, such as pagers, are becoming a prominent mode of communication today. Thin data units have limited processing power available, and run a minimum of software programs.

In parallel, the Internet has become the largest storehouse of information available. There is a sharp contrast between the wealth of information available to those who are "wired" into the Web, and the scarcity of information available to those are "unwired." To some extent this is due to the very small display size available in wireless units, and to some extent it is due to bandwidth limitations. Pager displays, for example, can be limited to 20 characters per line, with a maximum of 300 characters.

Typical wireless units today are capable of receiving text-only electronic mail, along with certain provider services such as stock market quotes and sports results.

SUMMARY OF THE INVENTION

There is provided in accordance with a preferred embodiment of the present invention a method of wireless data communication, including the steps of receiving an input request, filtering data from at least one database to produce filtered data in response to the input request, attaching formatting instructions to the filtered data corresponding to a data format specific to a wireless data terminal to produce a pre-formatted response, sending the pre-forrmatted response to a wireless transmitter, formatting the pre-formatted response according to the formatting instructions to produce a formatted response, and transmitting the formatted response from the wireless transmitter to the wireless data terminal.

There is also provided in accordance with a preferred embodiment of the present invention a method of data filtering for use within a wireless data communication system, including the steps of receiving an input request, filtering data from at least one database to produce filtered data in response to the input request, and transmitting the filtered data to a gateway.

There is also provided in accordance with a preferred embodiment of the present invention a method for wireless data communication, including the steps of filtering data from at least one database to produce filtered data in response to a pre-programmed message request, attaching formatting instructions to the filtered data corresponding to a data format specific to a wireless data terminal to produce a pre-formatted response, sending the pre-formatted response to a wireless transmitter, formatting the pre-forrmatted response according to the formatting instructions to produce a formatted response, and transmitting the formatted response from the wireless transmitter to the wireless data terminal.

There is also provided in accordance with a preferred embodiment of the present invention a method for data filtering for use within a wireless data communication system, including the steps of filtering data from at least one database to produce filtered data in response to a pre-programmed message request, and transmitting the filtered data to a gateway.

There is also provided in accordance with a preferred embodiment of the present invention a system for wireless data communication, including a receiver receiving an input request, a data filter filtering data from at least one database to produce filtered data in response to the input request, a station attaching formatting instructions to the filtered data corresponding to a data format specific to a wireless data terminal to produce a pre-formatted response, and a wireless transmitter formatting the pre-formatted response according to the formatting instructions to produce a formatted response, and transmitting the formatted response to the wireless data terminal.

There is also provided in accordance with a preferred embodiment of the present invention a system for data filtering for use within a wireless data communication system, including a receiver receiving an input request, a data filter filtering data from at least one database to produce filtered data in response to the input request, and a transmitter transmitting the filtered data to a gateway.

There is also provided in accordance with a preferred embodiment of the present invention a system for wireless data communication, including a data filter filtering data from at least one database to produce filtered data in response to a pre-programmed input request, a station attaching formatting instructions to the filtered data corresponding to a data format specific to a wireless data terminal to produce a pre-formatted response, a wireless transmitter formatting the pre-formatted response according to the formatting instructions to produce a formatted response, and transmitting the formatted response to the wireless data terminal.

There is also provided in accordance with a preferred embodiment of the present invention a system for data filtering for use within a wireless data communication system, including a data filter filtering data from at least one database to produce filtered data in response to a pre-programmed input request, and a transmitter transmitting the filtered data to a gateway.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present specification describes a method and system for connecting thin wireless units with the Internet, and providing a mobile user with access to information stored on the Web, on dynamically changing databases, on his personal computer, on other centralized sources of information or on a combination of such databases. Using the present invention, a mobile user can (i) access his e-mail, (ii) access his Personal Information Manager (PIM) data, and thus be kept current with his schedule and his current "to do" list, (iii) access sales and customer data while on the road, (iv) access up-to-date product pricing information, (v) access his financial information, and much more. The information transmitted to the mobile user is displayed on a thin data terminal belonging to the user, such as a pager. The terms "thin data terminal" and "thin data unit" are used synonymously, and refer to a wireless device that can only receive data in a simple text format.

The present specification describes a method and system whereby the mobile user can actively request specific data by means of a telephone unit or a two-way pager, or, alternatively, the mobile user can pre-program specific message requests on a regularly scheduled basis. In addition, the present specification also describes a data filter, for filtering information according to a user prescribed request.

Figure 1:
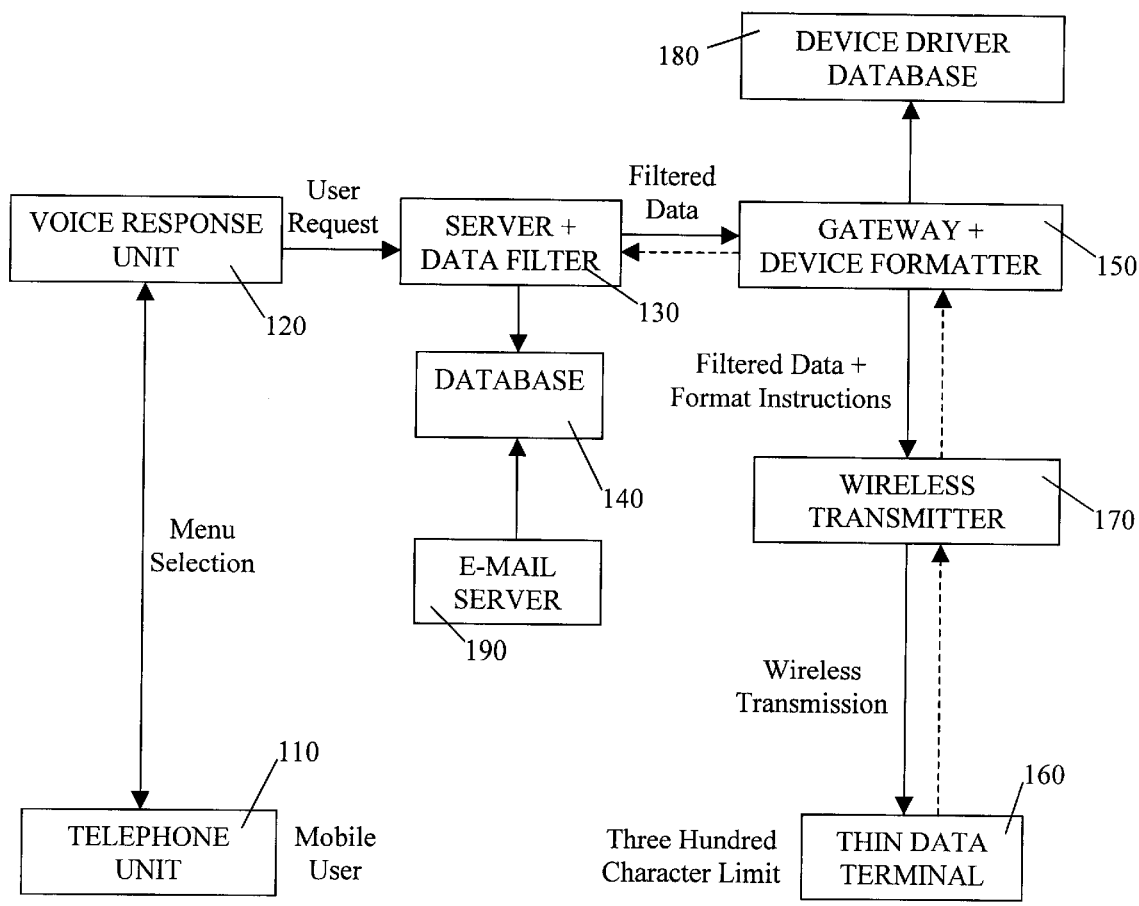
FIG. 1 is a simplified schematic diagram of a preferred embodiment of the present invention whereby a mobile user interactively requests data.
Figure 2:
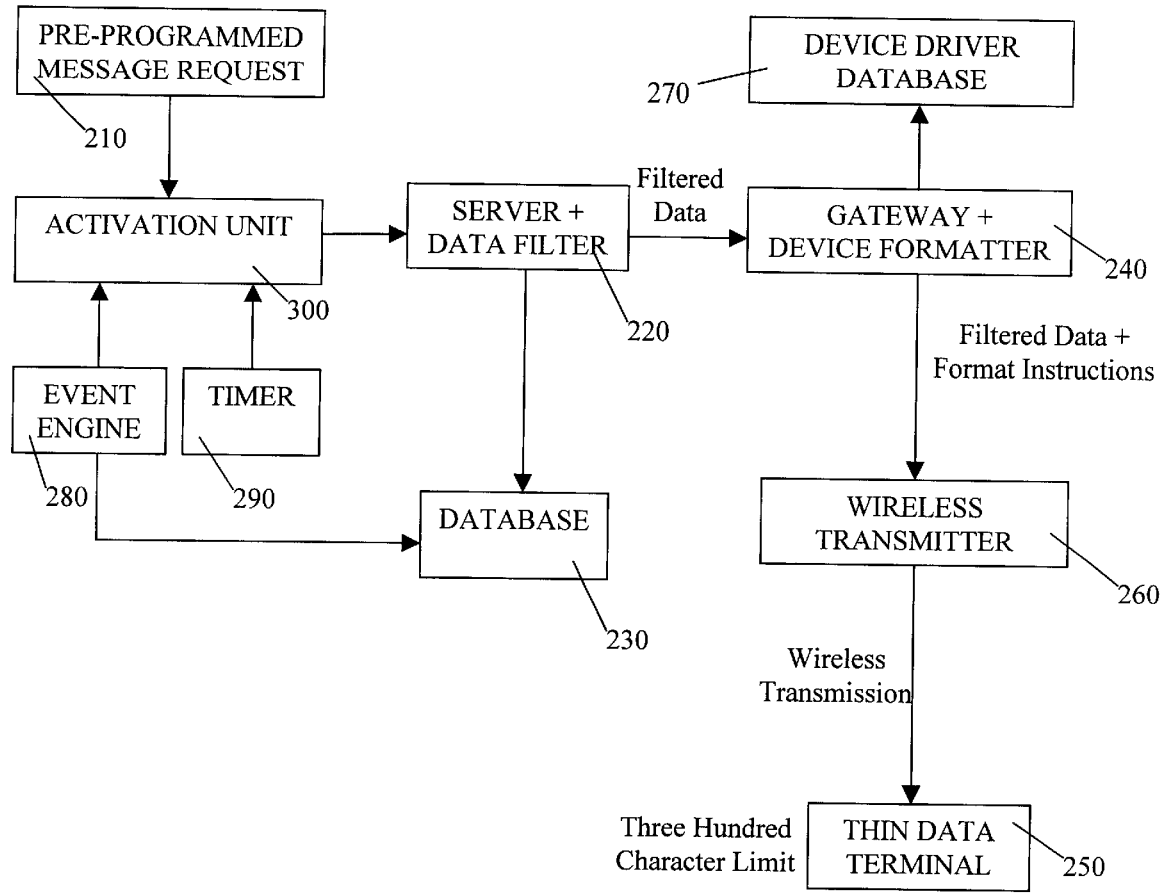
FIG. 2 is a simplified schematic diagram of a preferred embodiment of the present invention whereby a mobile user has pre-programmed requests for specific data to be transmitted according to specified schedule.

To assist in understanding the descriptions of FIGS. 1 and 2 that follow, three example sessions are described.

First Example Session—Filtered PIM Data

As a first example of the operation of a preferred embodiment of the present invention, a mobile user dials in to a voice response unit (VRU) by means of a telephone. The VRU reads out a first menu of options as follows:
1. E-MAIL
2. COMPANY SCHEDULER
3. PERSONAL ORGANIZER
4. SALES DATA
5. CUSTOMER DATA
Option 1 enables the user to access his electronic mail. Option 2 enables the user to access his company's on-line scheduler, so as to know his colleagues' schedules. Option 3 enables the user to access his personal calendar, schedule, projects, address and phone index. Option 4 enables the user to access his company's sales data. Option 5 enables the user to access his company's database of customer information.

The mobile user uses the numerical press keys on the telephone to select a specific option from the menu. Further menus are presented hierarchically as necessary, in order to further specify a user data request. For this first example, the user presses on the numeral 3 key to select option 3, "PERSONAL ORGANIZER," above. This selection is transmitted to the VRU and, in response, the VRU reads out a second menu as follows:
1. CALENDAR
2. TO DO LIST
3. ADDRESS BOOK
4. PROJECTS
5. JOURNAL
Option 1 enables the mobile user to access his calendar. Option 2 enables the user to access his list of current action items. Option 3 enables the user to access his address and phone index. Option 4 enables the user to access his list of projects. Option 5 enables the user to access his journal entries.

For this first example, the user presses on the numeral 2 key to select option 2, "TO DO LIST," above. This selection is transmitted to the VRU and, in response, the VRU reads out a third menu as follows:
1. BY PRIORITY
2. BY DUE DATE
3. DUE TODAY
4. DUE THIS WEEK
Option 1 instructs the VRU to initiate transmission of only the highest priority action items. Option 2 instructs the VRU to initiate transmission of those action items that have the nearest due dates. Option 3 instructs the VRU to initiate transmission of only those action items that fall due today. Option 4 instructs the VRU to initiate transmission of only those action items that fall due this week.

For this first example, the user presses on the numeral 4 key to select option 4, "DUE THIS WEEK," above. This selection is transmitted to the VRU and, in response, the VRU sends instruction to a server computer for accessing the user's PIM database. The server access is intermediated by a data filter, which acts as an agent. The data filter is instructed to extract only those action items from within the mobile user's to do list that fall due this week. Upon doing so, the server transmits the filtered information through a gateway to a transmitter which communicates with a thin data terminal belonging to the user, such as a pager, as described in detail hereinbelow with reference to FIGS. 1 and 2.

In this first example the wireless communication is controlled interactively by means of mobile user requests through a telephone dialing in to a VRU.

Second Example Session—Filtered E-mail

As a second example of the operation of a preferred embodiment of the present invention, a mobile user accesses his e-mail remotely. Each e-mail item contains a unique identifier, data fields including FROM, RE and DATE, a text body and one or more attachments. As in the first example above, the mobile user dials in to a voice response unit (VRU) by means of a telephone. The VRU reads out a first menu as follows:
1. E-MAIL
2. COMPANY SCHEDULER
3. PERSONAL ORGANIZER
4. SALES DATA
5. CUSTOMER DATA
For this second example, the user presses on the numeral 1 key to select option 1, "E-MAIL," above. This selection is transmitted to the VRU and, in response, the VRU reads out a second menu as follows:
1. LIST ALL BY SENDER
2. LIST ALL BY SUBJECT
3. LIST ALL BY DATE
4. LIST ALL BY ID
5. REQUEST ID
Option 1 provides a list of all e-mail from the user's inbox sorted by sender. Option 2 provides a list of all e-mail from the user's inbox sorted by subject. Option 3 provides a list of all e-mail from the user's inbox in chronological order. Option 4 provides a list of all of the user's e-mail sorted by identifier. Option 5 enables the user to key in a specific identifier, in case he already knows the identifier(s) of the item(s) he wants to download.

As regards option 5, the user's mail server may be programmed to automatically send him notification of particular incoming e-mail, such as those sent by the company president, or those marked as very high priority. Such notification would include a summary list of the relevant e-mail items, along with an identifier for each item. In such a case the user may already have a list of the e-mail identifiers that he wishes to download, and would want to request e-mail items by means of specific identifiers, rather than by stepping through a sequential list.

In a preferred embodiment of the present invention, such e-mail notification can arrive on the user's thin data terminal or, alternatively, by separate communication outside of the system described in this specification.

In this second example the user selects option 1, "LIST BY SENDER", in the first menu above. This selection is transmitted to the VRU, and, in response, the VRU sends instructions to a server computer for accessing one or more databases containing the user's e-mail and, through the intermediary of a data filter, transmits a second menu through a gateway to a thin data terminal as follows:
1. ID:018, FROM:ANDY, RE:MEETING TOMORROW, DATE:mm/dd/yy
2. ID:004, FROM:BILL, RE:SUNDAY PICNIC, DATE:mm/dd/yy
3. ID:103, FROM:CHARLIE, RE:UPCOMING EXAM, DATE:mm/dd/yy
4. ID:075, FROM:DAN, RE:DOCTOR'S APPOINTMENT, DATE:mm/dd/yy
5. <MORE>

Option 5, "<MORE>", is used for menus with lists that entail more information than can be received by the thin data terminal at once. This occurs when the thin data terminal bandwidth for receiving data is restricted to a limited amount of data. By selecting "<MORE>", the user requests transmission of additional data. Correspondingly, successive pages could have a "<BACK>" option for returning to previous items that are no longer in the thin data terminal memory.

After selecting a specific e-mail item, a third menu might be
1. FAX E-MAIL TO ME
2. FAX E-MAIL ATTACHMENT TO ME
3. SEND TEXT ONLY TO MY PAGER
4. <MORE>

Selecting option 1 informs the VRU to instruct the server computer to fax e-mail, without attachments, to the user's fax machine. Selecting option 2 informs the VRU to instruct the server computer to fax the e-mail attachments(s) to the user's fax machine. Selecting option 3 informs the VRU to instruct the server computer to send the text body of the e-mail to the user's pager. If option 3 is chosen, then the data filter would extract as much text as could be received at once by the thin data terminal. Successive packets of text can subsequently be requested by keying in option 4 for <MORE>.

In this second example the wireless communication is controlled interactively by means of mobile user requests through a telephone.

It is apparent to those skilled in the art that the first and second example session can be modified to describe optional selections other than e-mail and a personal organizer, such as those enumerated in the first menu (company scheduler, sales data, customer data) and other selections not in this list.

Third Example Session—Filtered PIM Data

In this third example, a user pre-programs message requests for wireless communication to his thin data terminal. Each pre-programmed message request includes one or more activation criteria, and a data filter description. The activation criteria describe situations whose occurrence is to initiate the wireless communication, and the data filter description describes the data that is to be transmitted.

The activation criteria replace the interactive requests from the telephone as in the two examples above. In those examples the data transmission is initiated by means of the mobile user dialing in to the VRU. In this third example the initiation is pre-programmed.

Activation criteria can be time-based and/or event-based. Time-based activation initiates data transmission at specific times. For example, a user can request that his daily schedule be transmitted to his pager at 6:00 AM every morning.

Event-based activation initiates data transmission whenever a specific event occurs within a specific database. Types of events include the arrival of new e-mail, an update to data within a PIM, new product pricing information taking effect or availability of new marketing material. For example, a user can request that his to do list be transmitted whenever it is updated, or that pricing information be transmitted whenever new pricing is in effect.

Activation criteria can be combined. For example, a user can request that his to do list be transmitted at 6:00 AM daily, but only when it has been updated.

Data filter descriptions replace the interactive menu-driven requests described in the two examples hereinabove. Rather than proceed through a hierarchy of menus, a pre-programmed message request delineates the specific portions of data requested from one or more databases. For example, a user can request that his action items falling due this week be transmitted daily at 6:00 AM. This defines a data filter for extracting action item data from the user's to do list, but only those action items falling due this week.

Finally, a pre-programmed message request can involve a series of activation criteria and data filters. For example, a user can request:
1. Apply data filter #1 according to activation criteria #1
2. Apply data filter #2 according to activation criteria #2
3. Apply data filter #3 according to activation criteria #3

Data filter #1 is the very high priority e-mail in the user's inbox, and activation criteria #1 is 6:00 AM every weekday morning. Data filter #2 is the company's sales data, and activation criteria #2 is the event that the sales database has been updated. Data filter #3 is the action items within the user's daily plan, and activation criteria #3 is a combination of 6:00 AM every weekday morning and the event that the user's daily planner has been modified.

Reference is now made to FIG. 1, which illustrates a simplified schematic diagram of a preferred embodiment of the present invention whereby a mobile user interactively requests data to be transmitted to his thin data terminal. A telephone unit 110 is used by a mobile user to send and receive instructions from a voice response unit 120. Telephone unit 110 calls in to voice response unit 120 and, in response, voice response unit 120 reads out a menu of options.

In one embodiment of the present invention, the user presses keys to select from menu options. In response to the user's key-press inputs, voice response unit 120 sends instructions to a server computer with a data filtering unit 130, connected to the Internet. In another embodiment of the present invention, the user speaks into the telephone, and a speech-to-text unit converts the user's speech into a menu option selection.

The filtering unit in server computer 130 accesses one or more appropriate databases 140, such as a personal organizer, e-mail or an HTML page from an Internet universal resource locator (URL), and filters appropriate data in accordance with the mobile user's request. For this purpose, databases 140 may be connected with the user's e-mail server 190. In the framework of the first example above, if the user selects the "DUE THIS WEEK" option from the third menu, the filter would access the to do list from the user's personal organizer database, and filter the specific action items falling due this week.

The filtered data, together with tags identifying the data and its origin and its destination, is sent to a gateway 150. Gateway 150 attaches formatting instructions that can be used to format the filtered data according to the characteristics of a mobile user's thin data terminal 160. In one embodiment of the present invention, gateway 150 is an e-mail server. In an alternative embodiment gateway 150 is a client for a wireless transmitter. Possible thin data terminal formats include e-mail, Short Message System (SMS) and various pager formats. The formatting instructions are based on the device characteristics of thin data terminal 160, such as the screen size and the characters supported. Many paging units support only a restricted set of characters.

The filtered data, together with the formatting instructions and the tags identifying the data and its origin and its destination, is sent from gateway 150 to a wireless transmitter 170, where the formatting instructions originating from gateway 150 are used to format the data into characters and lines of sizes appropriate to thin data terminal 160, and with appropriate control characters. Specific embodiments of wireless transmitter 170 include e-mail centers and short message centers.

Many thin data terminals are not able to interpret control characters, such as line feeds, carriage returns and tabs. In order to properly format the data, wireless transmitter 170 must insert appropriate white space and other characters to accomplish the same effect as if a control character were used. For example, the end of a line may be padded with white space and underscore characters, to have the effect of a carriage return. Similarly, white spaces and underscore characters may have to be used for special formatting, such as double-column output, as would be appropriate in a product price list.

The data from wireless transmitter 170 must arrive at thin data terminal 160 ready for display, since thin data terminal 160 does not contain client software for formatting purposes. A special feature of a preferred embodiment of the present invention is the ability to serve data to a variety of thin data terminals, that is "display-ready" for each intended thin data terminal.

Gateway 150 accesses a device driver database 180, containing device characteristics for a variety of thin data terminals. In one embodiment of the present invention the user may have several thin data terminal units at his disposal, and can specify to which one the requested data should be transmitted. Accordingly, gateway 150 receives instructions from server computer 130 as to which terminal unit the filtered data should be formatted for. Gateway 150 then accesses the appropriate device characteristics from database 180, and produces a corresponding set of formatting instructions for wireless transmitter 170.

In an alternate embodiment thin data terminal 160 may have two-way communication capability, so that the menu-driven communication can take place directly on the thin data terminal, without the use of voice response unit 120 and telephone unit 110. Instead, thin data terminal 160 communicates with server computer 130 through gateway 150 and through wireless transmitter 170, as indicated by the dashed arrows in FIG. 1. In this embodiment voice response unit 120 and telephone unit 110 are not user, and both user input requests and responses occur within thin data terminal 160.

Reference is now made to FIG. 2, which illustrates a simplified schematic diagram of a preferred embodiment of the present invention whereby a mobile user has pre-programmed message requests for specific data to be transmitted according to specified schedule. In this embodiment a user provides a pre-programmed message request 210 for wireless communication of data, along with activation criteria for transmitting the data. As in FIG. 1, the data is transmitted to a thin data terminal belonging to the user.

As described above with reference to the third example, a pre-programmed message request contains a list of activation criteria and corresponding data filters. Activation criteria are used to initiate wireless data communication, and can be time-based or event-based, or a combination of both. Data filters define specific portions of data to be extracted from one or more on-line databases. Activation unit 300 operates to receive information from a timer 280 and an event engine 290, and initiate a data filter request corresponding to pre-programmed activation criteria when such activation criteria are met. Event engine 290 operates to monitor one or more databases 230 in order to ascertain when specific events occur.

Whenever the wireless system is activated by activation unit 300 to transmit data in accordance with activation criteria from pre-programmed message request 210, a server computer 220 having a filtering unit accesses one or more appropriate databases 230 and filters appropriate data, in accordance with the mobile user's pre-programmed message request 210, similar to the operation of the filtering unit within server computer 130 in FIG. 1. Since the data being accessed is dynamically being changed, the filtering unit in server computer 220 preferably accesses the database(s) anew, unless the requested data was previously cached and there is an indication that the requested data has not changed since the last time it was accessed.

The filtered data is sent to a gateway 240, which operates like gateway 150 from FIG. 1, and attaches formatting instructions that can be used to format the filtered data according to a mobile user's thin data terminal 250. The filtered data, together with the formatting instructions, is sent from gateway 240 to a wireless transmitter 260, similar to the wireless transmitter 170 from FIG. 1, where the formatting instructions originating from gateway 240 are used to format the data into characters and lines of sizes appropriate to thin data terminal 250.

As in FIG. 1, gateway 240 accesses a device driver database 270, with information characterizing a variety of thin data terminal units. The mobile user may have several thin data terminals at his disposal, and can specify to which one the requested data is to be transmitted.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for data communication over the Internet comprising:

using a telephone, establishing a call to an interactive voice response unit; within the context of the call, employing the interactive voice response unit to access an Internet server via the Internet;

within the context of the call and using the telephone and the interactive voice response unit, selecting information from the Internet via said Internet server; and supplying said information to a user-selected destination in a user-selected format including:

appending, by an automatic system, formatting instructions to said information; and employing said formatting instructions by said automatic system to format said information so as to be "display-ready" at said user-selected destination.

2. A method according to claim 1 and wherein said user-selected destination is a device employed by the user during the call to enable the user to sense, during the call, the information received at the user-selected destination.

3. A method according to claim 2 and wherein based on the information received at the user-selected destination, the user is able, within the context of said call, by employing said interactive voice response unit, to select additional information from the Internet via said Internet server.

4. A method for data communication over the Internet comprising:
using a telephone, establishing a call to an interactive voice response unit;
within the context of the call, employing the interactive voice response unit to access an Internet server via the Internet; and
within the context of the call and using the telephone and the interactive voice response unit, selecting information from the Internet via said Internet server,
and wherein at least one of the establishing of the call and the selecting of information are pre-programmed by employing activation criteria which are at least one of event-based and time-based.

5. A system for data communication over the Internet comprising:
an interactive voice response unit communicating via an Internet protocol with an Internet server, via the Internet;
a telephone communicating with said interactive voice response unit and via the interactive voice response unit, within the context of a call, accessing said Internet server via the Internet, thereby enabling a user to select information from at least one URL on the Internet via said Internet server and via said telephone; and
a communications facility supplying said information to a user-selected destination in a user-selected format, and wherein said communications facility supplying said information to a user includes:
a formatting instructions generator, appending formatting instructions to said information; and
a formatter, employing said formatting instructions to format said information so as to be "display-ready" at said user-selected destination.

6. A system for data communication over the Internet comprising:
an interactive voice response unit communicating via an Internet protocol with an Internet server, via the Internet; and
a telephone communicating with said interactive voice response unit and, via the interactive voice response unit, within the context of a call, accessing said Internet server via the Internet, thereby enabling a user to select information from at least one URL on the Internet via said Internet server and via said telephone,
and wherein at least one of the establishing of the call and selecting of information are pre-programmed by employing activation criteria which are at least one of event-based and time-based.

7. A system according to claim 5 and wherein said user-selected destination is a device employed by the user during the call to enable the user to sense, during the call, the information received at the user-selected destination.

8. A system according to claim 7 and wherein the system enables a user, based on the information received at the user-selected destination, within the context of said call, to employ said interactive voice response unit, for selecting additional information from the Internet via said Internet server.

9. A method for data communication over the Internet comprising:
using a telephone, establishing a call to an interactive voice response unit;
within the context of the call, using voice, employing the interactive voice response unit to access an Internet server via the Internet;
within the context of the call and using the telephone and the interactive voice response unit, using voice, selecting information from at least one URL on the Internet via said Internet server; and
supplying said information to a user-selected destination in a user-selected format including:
appending, by an automatic system, formatting instructions to said information; and
employing said formatting instructions by said automatic system to format said information so as to be "display-ready" at said user-selected destination.

10. A method for data communication over the Internet comprising:
using a telephone, establishing a call to an interactive voice response unit;
within the context of the call, using voice, employing the interactive voice response unit to access an Internet server via the Internet; and
within the context of the call and using the telephone and the interactive voice response unit, using voice, selecting information from at least one URL on the Internet via said Internet server, and wherein at least one of the establishing of the call and the selecting of information are pre-programmed by employing activation criteria which are at least one of event-based and time-based.

11. A method according to claim 9 and wherein said user-selected destination is a device employed by the user during the call to enable the user to sense, during the call, the information received at the user-selected destination.

12. A method according to claim 11 and wherein based on the information received at the user-selected destination, the user is able, within the context of said call, by employing said interactive voice response unit, to select additional information from the Internet via said Internet Server.

13. A system for data communication over the Internet comprising:
an interactive voice response unit communicating via an Internet protocol with an Internet server, via the Internet,
a telephone communicating with said interactive voice response unit by voice and via the interactive voice response unit, within the context of a call, accessing said Internet server via the Internet, thereby enabling a user to select information from at least one URL on the Internet via said Internet server and via said telephone; and
a communications facility supplying said information to a user-selected destination in a user-selected format, and wherein said communications facility supplying said information to a user includes:
a formatting instructions generator, appending formatting instructions to said information; and
a formatter, employing said formatting instructions to format said information so as to be "display-ready" at said user-selected destination.

14. A system for data communication over the Internet comprising:
an interactive voice response unit communicating via an Internet protocol with an Internet server, via the Internet;
a telephone communicating with said interactive voice response unit by voice and via the interactive voice response unit, within the context of a call, accessing said Internet server via the Internet, thereby enabling a user to select information from at least one URL on the Internet via said Internet server and via said telephone, and wherein at least one of the establishing of the call and selecting of information are pre-programmed by employing activation criteria which are at least one of event-based and time-based.

15. A system according to claim 13 and wherein said user-selected destination is a device employed by the user during the call to enable the user to sense, during the call, the information received at the user-selected destination.

16. A system according to claim 15 and wherein the system enables a user, based on the information received at the user-selected destination, within the context of said call, to employ said interactive voice response unit, for selecting additional information from the Internet via said Internet server.

* * * * *